Figure 1:
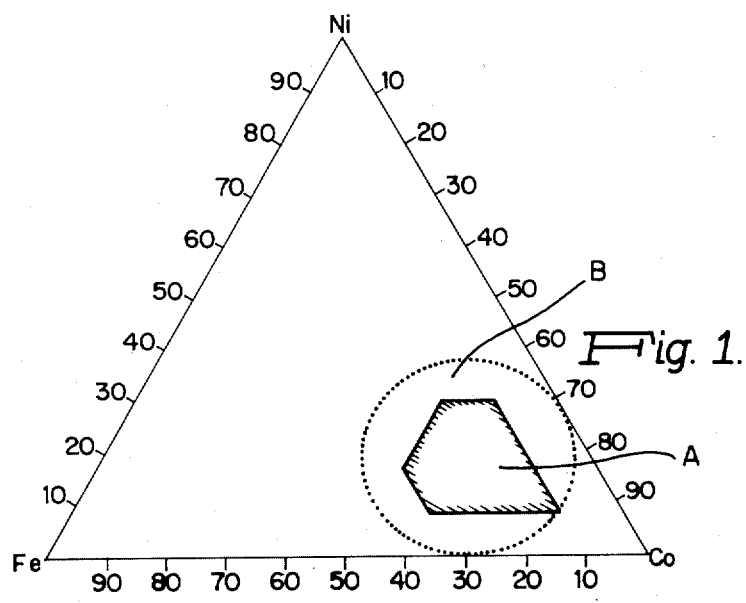

United States Patent [19]

Deffeyes

[11] 4,054,530
[45] Oct. 18, 1977

[54] IRON-NICKEL-COBALT MAGNETIC POWDER AND TAPE PREPARED THEREFROM

[75] Inventor: Robert J. Deffeyes, Arlington, Tex.

[73] Assignee: Graham Magnetics, Inc., Graham, Tex.

[21] Appl. No.: 695,656

[22] Filed: June 14, 1976

Related U.S. Application Data

[63] Continuation of Ser. No. 411,670, Nov. 1, 1973, abandoned, and a continuation-in-part of Ser. No. 401,636, Sept. 28, 1973, Pat. No. 3,909,240.

[51] Int. Cl.² .......................... H01F 1/02; C22C 1/04; C04B 35/04
[52] U.S. Cl. .......................... 252/62.54; 75/.5 AA; 148/105; 252/62.55; 428/900
[58] Field of Search ............ 75/.5 AA, 119; 148/103, 148/105, 108, 31.55; 252/62.55, 62.54; 428/425, 538, 900

[56] References Cited

U.S. PATENT DOCUMENTS

| 3,902,888 | 9/1975 | Aonuma et al. | 75/.5 AA |
|---|---|---|---|
| 2,002,689 | 5/1935 | Bozorth et al. | 148/31.55 |
| 3,190,748 | 6/1965 | Landgraf | 75/119 |
| 3,206,338 | 9/1965 | Miller et al. | 148/105 |
| 3,567,525 | 3/1971 | Graham et al. | 148/31.55 |
| 3,909,240 | 9/1975 | Deffeyes et al. | 75/.5 AA |
| 3,943,012 | 3/1976 | Tamai et al. | 148/105 |

Primary Examiner—Walter R. Satterfield
Attorney, Agent, or Firm—Robert A. Cesari; John F. McKenna; Andrew F. Kehoe

[57] ABSTRACT

A magnetic tape based on a cobalt-nickel-iron powder having an extraordinary combination of chemical stability and magnetic properties.

20 Claims, 4 Drawing Figures

IRON-NICKEL-COBALT MAGNETIC POWDER AND TAPE PREPARED THEREFROM

RELATED APPLICATIONS

This Application is a continuation of commonly owned and co-pending Ser. No. 411,670 filed Nov. 1, 1973, now abandoned, and a continuation-in-part of commonly owned (and co-pending with Ser. No. 411,670) Ser. No. 401,636 filed on Sept. 28, 1973. Ser. No. 401,636 is now U.S. Pat. No. 3,909,240.

BACKGROUND OF THE INVENTION

There has long been a serious problem in providing cobalt-based magnetic powders having good magnetic properties and good corrosion properties. Materials having good magnetic properties tend to have lower corrosion resistance than is desirable, (especially when in the micron- or sub-micron size ranges, i.e., in the making of single-domain particles). When substantial quantities of a material like nickel are used to increase the corrosion resistance, the magnetic properties of a material formed primarily of cobalt or iron markedly.

A great deal of work has been done on particulate metal powder systems in an attempt to provide powders which are economically practical in magnetic recording systems. A substantial part of this work has been directed to study of systems involving cobalt-based powders and combinations of chromium and or iron with cobalt. In general, the work has resulted in serious practical problems including batch-to-batch variations in product characteristics, and chemical stability under humid air conditions. Some such problems are discussed in the literature, e.g. by Bates and Alstead in IEEE Transactions on Magnetics, MAG-5, December 1969, Page 832. Much of this work was done on a composition having a major amount of iron. One such material (55% iron, 40% cobalt, 5% nickel) thought to be particularly useful by the investigators was not commercially successful, probably because of the aforesaid problems.

Other work included that of Luborsky. The literature indicates that particles produced by his method of electro-depositing the metal on mercury, were not stable. Luborsky used up 41.5% cobalt in his iron-cobalt systems. His materials, which also would have very low magnetic moment on a volume basis, were described in *The Physics Of Magnetic Recording*, by C.D. Mee (North Holland Publishing Company, Amsterdam; 1968).

Haines and Johnston, authors of U.S. Pat. Nos. 3,574,685 and 3,574,683, respectfully, have worked with iron-cobalt-nickel systems and have recommended systems of 60% iron and 40% cobalt. Although, they have claimed the capability of making an entire range of cobalt-iron-nickel materials, it appears from attempts to duplicate their work, their compositions tend to be predominantly iron, in spite of cobalt's presence in the reaction medium.

Ehrreich and Reti, in commonly-owned and co-pending U.S. Ser. No. 228,387, disclosed an 85% cobalt — 15% nickel system which was an improvement over any known prior art materials but which lacked the advantages — especially corrosion resistance of the material of this invention to be described below. As with Luborsky, it appears that unessential contamination of the product inherent in the techniques of the inventors, interfered with their obtaining optimum properties. Moreover, such a material is relatively expensive since it lacks any iron.

In most of the work directed to cobalt-nickel-iron alloy, materials have been produced in the area of 5 – 12% nickel but with about 50 percent of iron or more. Besides having the basic problems associated with less-than-desirable combination of corrosion resistance and magnetic properties, the manufacture of this type of material is illustrative of problems which beset thoe attempting to scale up processes for making magnetic-alloy powders, by forming the alloy in the particulate form. Normally such processes involve a reaction in liquid medium whereby the metal atoms first come together to form either an alloy particle or a precursor to the alloy particle, such precursors, say oxalate salts, contain the metal atoms which, on reduction, or some such conversion step, will from the metal particles. The problem is to assure that batch-to-batch, and even particle-to-particle, uniformity is achieved even if small variations in metal ratios are caused by inattention of workmen, less than optimum mixing, variations in raw materials, or whatever reason. In these systems even small changes in metal ratio can result in major changes in magnetic properties of the particle or batch. For example, a targeted 52:5:43 ratio of iron, nickel and cobalt respectively would yield a maximum permeability of about 1000, but if a particle had a 50:8:42 ratio, this permeability would drop to about 500. The ability of simultaneously overcoming this processing problem and the corrosion and magnetic-property problems, will be seen to be an important feature of the process disclosed below.

SUMMARY OF THE INVENTION

Therefore, it is an object of the invention to provide a cobalt-based magnetic powder of excellent magnetic properties and excellent magnetic properties and excellent resistance to chemical deterioration, even when the powder is in the submicron size range.

Other objects of the invention are to provide a superior acicular cobalt-based powder for use in magnetic recording media such as tapes and disks and to provide a novel magnetic recording media formed therewith.

Another object of the invention is to provide a relatively dependable process facilitating the production and quality control of magnetic powders and magnetic recording media produced therewith.

Other objects of the invention will be obvious to those skilled in the art on reading the instant application.

The above objects have been substantially achieved by the discovery that certain metal ratios, when utilized in making magnetic metallic powders, have all of the following advantages, none of which are believed to be closely related from a theoretical viewpoint, but all of which are of major importance to the manufacture and uses of magnetic powders:

1. Excellent magnetic properties
2. Excellent chemical resistance, e.g. corrosion resistance
3. Insensitivity of magnetic properties to small variations in metallic ratios as may occur from batch-to-batch (and indeed from particle-to-particle in a batch) under production conditions.

This combination of properties is not only remarkable per se but is even more remarkable in view of the probable absence of any other family of metal powder having a similar advantageous combination of properties.

The metallic ratios involved are defined as follows on a weight percentage basis:

Iron: 10 – 33%
Nickel: 8 – 30%
Cobalt: 50 – 82%.

In the more advantageous embodiments of the invention the nickel is raised to at least about 12% level and no more than about 24% iron is utilized. Moreover, it is found that, in many applications, manganese can be substituted for all or some of the nickel; the resultant powders have relatively low magnetic moment but they retain most of the other desirable properties.

The nickel-bearing powders of the invention are characterized by the following specific properties:

Coercive Force: 500 to 900
Specific Magnetic Moment: 120 to 190
Squareness: 0.5 to 0.85
Corrosion Resistance: Ability to maintain at least 50% of the Specific Magnetic Movement (sometimes called the sigma value) when exposed to 50% relative humidity at 166° F. for 100 hours.

Such properties are believed to be novel within the ternary metal systems under discussion. In fact, however, it is advantageous to form powders that maintain at least 70% of the specific magnetic moment when exposed to the aforesaid heat-and-humidity test.

The powders formed according to the instant invention may be of any shape: for magnetic tape applications the powder should be acicular having average length-to-diameter ratios than 3 to 1 or more. In general, acicular products discussed herein are powders having an average minimum length of about 0.5 microns and an average maximum average length of 5 microns. However, it should be realized that the excellent corrosion properties, the process advantages, and those magnetic attributes not depending on an acicular shape, are all enjoyed by nonacicular particles which find use in magnetic recording disks and other such applications.

The particular novel magnetic metal powders described in this application are generally useful in formulating magnetic recording systems wherein the ferromagnetic component is formed entirely or in part with these novel powders. The magnetic powder alloys system, because of their inherent stability can be utilized in processes which involve the use of some non-magnetic additives or dopants; but, when utilizing such processes care should be taken to avoid such modifications of the alloy structure that will diminish its desirable characteristics. However, it should be emphasized that one particularly advantageous aspect of the powders of the invention is that they already have all or most of the characteristics that one could desire for most applications and, consequently do not require non-magnetic dopants or dilution with other compounds, or materials.

A particular advantage of the invention is the ease by which the powders may be made without undesirable variations in magnetic properties. It will be understood that in the formation of organometallic salt particles by reaction of various metal salts with, say, carboxylic acids, there is a problem in assuring each organic salt particle has precisely the same ratio of metals therein. This problem in accentuated when one leaves the laboratory and uses larger apparatus and personnel which is not technically trained. However, the metallic particles of the present invention fall into an area of the cobalt-nickel-iron ternary system which is relatively "flat". Thus, any small deviations from the targeted ternary composition will not yield such substantial changes in magnetic properties as would occur were changes of similar magnitude to occur in other areas of a ternary diagram representative of cobalt, nickel and iron alloys of desirable chemical and magnetic properties. Moreover, when reduction conditions of an organometallic salt precursor are varied widely, magnetic properties such as coercive force and squareness show surprisingly small changes.

ILLUSTRATIVE EXAMPLE OF THE INVENTION

In order to point out more fully the nature of the present invention, the following specific examples are given as illustrative embodiments of the present process and products produced thereby.

IN THE DRAWINGS

FIG. 1 is a ternary diagram of the cobalt-nickel-iron system with a shaded area indicated thereon which area corresponds to the alloys of which the novel particles defined herein are formed. This area, A, relates to particles having:

10 to 33% iron
50 to 82% cobalt
8 to 30% nickel

It will be understood that the definition of this area is not intended to waive coverage of particles falling just outside the designatd area wherein such proximate exterior areas such as defined by Circle B are novel and not suggested by any prior art as having the advantages disclosed herein for making particles for ferromagnetic recording media.

Figure 2:
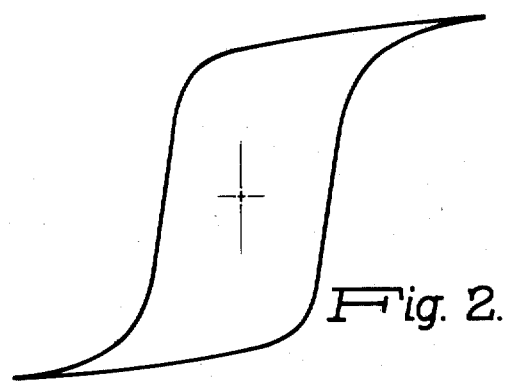
Figure 3:
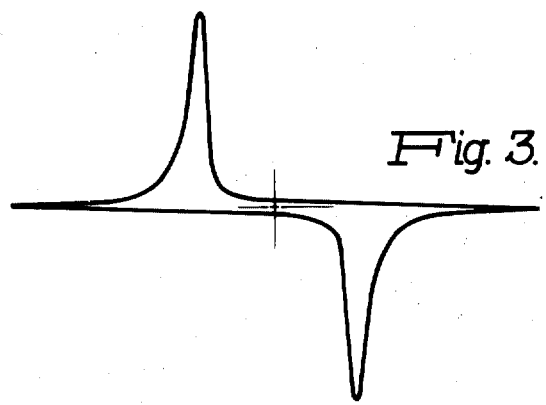
Figure 4:
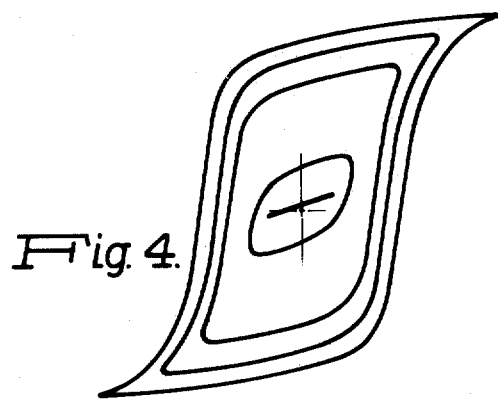

FIGS. 2 through 4 show typical hysteresis curves of a novel magnetic powder produced by the process of the invention as described in Example 1. FIG. 2 is an integrated hysteresis loop; FIG. 3 is a similar loop but with an unintegrated value of the magnetic moment with time (a dM/dt curve); and FIG. 4 shows a series of hysteresis loops achieved for a single sample of particles under varying applied magnetic fields.

The abscissa of the graph of FIGS. 2 range from $-2000$ to $+2000$ oersteds and represents the 2000 oersted magnetic field in which the measurements are carried out. The ordinate can be considered as arbitrarily selected to aid demonstration of the difference between tested specimens. (The abscissa in FIG. 2 is reversed, and reads from $+2000$ to $-2000$, left to right.)

FIGS. 2 – must be interpreted with the following in mind: They are in many respects comparative, measured on the same BH meter and consequently characteristics attributable to the electrical characteristics of the meter are a common factor in all the drawings. In general, this is a minor factor. Most useful BH meters will produce very similar curves. Moreover, in making such pictures, as shown in FIG. 3, the distance from the origin (zero field point) to the peaks should be not more than about one-third of the distance from the origin to the maximum applied field. This is to assure that a particular angular function tending to "fatten" these peaks is made negligible.

However, once these facts are realized, the drawings in FIG. 2 can be used to define highly advantageous and novel features of the invention.

$\Delta H$, peak-spread width at 50% of the peak height, over H, the distance from the origin of the curve to the vertical line from the center of the peak. It is believed no acicular based particulate material known to the prior art has ever had a value of (ΔH/H) of less than about 0.75. Yet the value of the (ΔH/H) material of Example 1 is about 0.62.

The particular distribution patterns illustrated by these graphs are largely due to the process utilizing a seeding step and metal complexing agents rather than the particular alloy involved. However, they are descriptive of some advantages of the product when prepared according to such favored processes, examples of which are set forth below.

EXAMPLE 1

The following procedure is particularly useful in providing acicular particles for use, say, in magnetic tape.

A seed crystal of cobalt oxalate was prepared by adding to a solution of oxalic acid (Solution 1) a cobalt-bearing solution (Solution 2):

SOLUTION 1

25.2: grams of oxalic acid dihyrate
150: grams of a clear polysaccharide syrup digestible to dextrose and sold under the trade designation Karo by Best Foods of Englewood, New Jersey
150: grams of denatured ethyl alcohol
150: grams of deionized water.

SOLUTION 2

25: grams of cobaltous acetate tetrahydrate
25: grams of citric acid, USP Grade
50: grams of the aforesaid Karo syrup
50: grams of denatured ethyl alcohol
50: grams of water.

Solution 2 is added slowly to the Solution 1 while the resultant mixture is stirred magnetically in a baffled Erlenmeyer-type flask of a 1-liter capacity. As the addition proceeds, a precipitate forms and a resultant suspension becomes so thick that the stirring bar may stop and require restarting. In fact, it is sometimes advantageous to stop the bar and remove air bubbles therefrom to decrease the resistance of the bar to rotation. As the mix becomes even thicker, it is desirable to lower the tip of a funnel through which the addition is being made to a point about ¼ inch above the stirring bar.

The resultant suspension is used as a "seed crystal" material in the following procedure:

A quantity of 25.2 grams oxalic acid dihydrate is dissolved in 400 milliliters of deionized water to form a third solution. To this third solution is added 100 milliliters of the seed crystal suspension described above and which results from the addition of Solution 2 to Solution 1. The result of this addition is the formation of a seeded oxalic acid solution.

A fourth solution is then prepared as follows:

18: grams of cobalt nitrate hexahydrate
5: grams of ferrous sulfate heptahydrate
5: grams of nickel nitrate
150: grams of water.

This fourth solution is added to the seeded oxalic acid solution with vigorous stirring. The addition takes about 6 minutes. After the addition of the solution is complete, the resulting mix is agitated for an additional 30 minutes before being filtered.

The filter cake is washed with 600 ml. of hot water, then 200 ml. of acetone.

After being air dried at 80° F. amd the resultant metal oxalate was wetted with some isopropanol treated with a 10% solution of a resinous polymeric material, a polyamide resin, sold under the trade designation Resymide 1125 by RESYN Corporation. The amount of resin was selected to equal 7 percent by weight of the metal content of the oxalate. This type of treatment has been found to be useful in the thermal reduction of organometallic salts to ferromagnetic powders. Some ethanol was added to the oxalate-resin mixture to make a thin slurry and facilitate distribution of resin on the surfaces of the oxalate. The oxalate was dried by evaporation.

The reduction was carried out by placing the powder in sample boats containing eight different compartments. The sample boats are sealed in tubes having gas inlet and gas outlet ports, then placed in an oven, with conduits to both the outlet and inlet port extending from the oven to a gas-supply source and a gas exhaust system, respectfully. The tubes are purged with $N_2$; then the oven temperature is set for 650° F. and a gas mixture of 20% hydrogen and 80% nitrogen is passed through the tubes at the rate of 40 cc per minute. Within about 45 minutes, $CO_2$ evolution starts. After the rate of $CO_2$ evolution peaks and drops to less than 0.01% by volume of the offgas, the tube is purged with nitrogen, and removed from the furnace. After cooling to room temperature—this usually takes an hour or so—a mixture of 3% oxygen and 97% nitrogen is passed through the tube. This gas mixture is usually allowed to run for several hours but the exact time, or even the exact composition, is not particularly critical.

Then the reactor is purged with air for 2 hours and opened. The samples are removed and are ready for analysis.

Specific Magnetic Moment — 138 emu/gram
Coercive Force — 659 oersteds
Squareness — 0.84.

When samples of the powder were exposed for 100 hours at 166° Fahrenheit and 50% relative humidity, 83% of the original Specific Magnetic Moment was present after the exposure.

The product was an acicular powder having an average particle size of about 0.5 micron by about 0.15 micron. It had a metal content of about 18 parts nickel, 18 parts iron, and 64 parts cobalt.

Drawings of the hysteresis loop and of the dM/dt curves are shown in FIGS. 2 – 4. Samples of this material were stored in a humidity oven (Tenney Engineering, Union, New Jersey, Model TMTH 0200) at 66° C. and 50% relative humidity for 160 ½ hours. After this exposure, the specific magnetic moment was found to be 112 emu/gram.

The material comprises about 18% nickel, 18% iron and 64% cobalt and has an extraordinary combination of corrosion-resistance and magnetic properties.

EXAMPLE 2

A seed crystal of nickel oxalate was prepared as follows:

A first solution is formed of 25.2 grams of oxalic acid dihydrate, 150 grams of Karo syrup, 150 grams of ethyl alcohol and 150 grams of water. A second solution is formed of 29 grams of nickel nitrate hexahydrate dissolved in 50 grams of Karo syrup, 50 grams of ethyl alcohol and 50 grams of water. The second solution was added, over a period of about 15 minutes, to a 1-liter baffled Erlenmeyer flask while agitation was provided with a magnetically-actuated stirring bar. A suspension containing a blue-green precipitate resulted. On microscopic examination, the precipitate appeared to be formed of particles having no discernable elongate shape.

A hundred milliliters of the resulting suspension of this precipitate was mixed again in a baffled 1-liter Erlenmeyer flask into a third solution comprising 25.2 grams of oxalic acid dehydrate in 400 ml. of demineralized water. The resulting mixture was stirred for several minutes to dispense the nickel seed; thereupon, a fourth solution was added to the flask containing six grams of nickel nitrate hexahydrate, 6 grams of iron sulfate heptahydrate, 18 grams of cobalt nitrate and 200 ml. of water.

As this fourth solution was added to the seed-bearing mixture, a brownish precipitate formed. This precipitate, a mixed oxalate of iron, nickel and cobalt, was readily filtered and washed with hot water and then acetone: it was not acicular. After being coated and subjected to a thermal reduction step as indicated in claim 1 a non-acicular metal alloy powder comprising 18% nickel, 64% cobalt and 18% iron was obtained. This powder had the following magnetic properties:

Specific Magnetic Moment: 140 emu/gram
Coercive Force: 690 oersteds
Squareness: 0.54.

MAKING MAGNETIC TAPE

The metal powders produced by the processes of this invention may be advantageously incorporated into magnetic tape utilizing many different polymer systems. However, in order to obtain a favorable loading it is believed to be most desirable to use pre-polymerized urethane resin systems. One such system would comprise 77 parts by weight of the metal powder product of Example 1, 2 parts soya lecithin, 19 pounds of the prepolymerized polyurethane resin sold under the trade designation Estane 5707 by B.F. Goodrich Co., and as described in U.S. Pat. No. 2,871,218 to Schollenberger. Other additives would normally be added. These additives are known to those generally skilled in the art, and include fungicides, and the like. Two parts by weight of butoxyethyl stearate and 0.1 part by weight of diphenyl mercury would be suitable adjuvants for the formulation given above. The formulation when adequately mixed would be coated along a substrate such as a polyethylene terephthalate polymer film substrate, dried and slit for winding onto spools: all such processes are well known in the art.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. A ferromagnetic powder product comprising an alloy of:
    about 10 to 33 weight % iron
    about 8 to 30 weight % nickel
    about 50 to 82 weight % of cobalt said powder having a maximum average dimension of 5 microns, and which has:
    a coercivity of at least 500
    a magnetic moment of at least 140 and a
    squareness of at least 0.5.

2. A product as defined in claim 1 but wherein said iron is from 10 to 24% and the nickel is at least 12%.

3. A product as defined in claim 1 which, when exposed to 50% relative humidity at 166° F. for 100 hours retains at least 50% of the specific magnetic moment which characterized it before said exposure.

4. A product as defined in claim 1 wherein said powder has a squareness of at least 0.72.

5. A product as defined in claim 2 which, when exposed to 50% relative humidity at 166° F. for 100 hours retains at least 50% of the specific magnetic moment which characterized it before said exposure.

6. A product as defined in claim 2 wherein said powder is formed of acicular particles having average length-to-width ratio of at least 3:1 and have length of from 0.3 to about 5 microns and has a squareness of at least 0.72.

7. A product as defined in claim 3 wherein said powder is formed of acicular particles having average length-to-width ratio of at least 3:1 and have length of from 0.3 to about 5 microns and has a squareness of at least 0.72.

8. A ferromagnetic powder product as defined in claim 1 wherein the alloy consists essentially of
    about 18 weight % iron
    about 18 weight % nickel
    about 64 weight % cobalt.

9. The ferro magnetic powder product defined in claim 5 wherein the alloy consists essentially of:
    about 18 weight % iron
    about 18 weight % manganese
    about 64 weight % cobalt.

10. The ferromagnetic powder product defined in claim 1 wherein the nickel is substituted for by manganese.

11. A magnetic recording medium of the type comprising a metallic powder dispersed in a polymeric binder wherein said powder is formed of an alloy consisting essentially of
    about 10 to 33 weight % iron,
    about 8 to 30 weight % nickel, and
    about 50 to 82 weight % cobalt;
    and wherein said powder is characterized by
    a. a minimum squareness of about 0.5
    b. a minimum coercive force about 500 oersteds, a specific magnetic moment of 140 to 190, and a corrosion resistance characterized by the ability to maintain at least 50% of its specific magnetic moment when exposed to 50% relative humidity at 166° F. for 100 hours.

12. A recording medium as defined in claim 11 wherein the metallic powder has a squareness of at least 0.72.

13. A recording medium as defined in claim 12 wherein said iron is from 10 to 24% and the nickel is at least 12%.

14. A recording medium as defined in claim 13 wherein the metallic powder has a squareness of at least 0.72.

15. A recording medium as described in claim 11 wherein some of the nickel is replaced with manganese.

16. A recording medium as described in claim 11 wherein at least 70% of said specific magnetic moment is retained after said exposure.

17. A recording medium as described in claim 13 wherein at least 70% of said specific magnetic moment is retained after said exposure.

18. The recording medium defined in claim 11 wherein the alloy consists essentially of:
   about 18 weight % iron
   about 18 weight % nickel
   about 64 weight % cobalt.

19. The magnetic recording medium defined in claim 13 wherein the alloy consists essentially of:
   about 18 weight % iron
   about 18 weight % nickel
   about 64 weight % cobalt.

20. The medium defined in claim 14 wherein the alloy consists essentially of:
   about 18 weight % iron
   about 18 weight % nickel
   about 64 weight % cobalt.

* * * * *